(12) United States Patent
Foster

(10) Patent No.: US 6,682,388 B1
(45) Date of Patent: Jan. 27, 2004

(54) BONE REED FOR ANIMAL CALL

(75) Inventor: Anthony A. Foster, Brookhaven, MS (US)

(73) Assignee: EBSCO Industries, Inc, Birmingham, AL (US)

( * ) Notice: Subject to any disclaimer, the term of this patent is extended or adjusted under 35 U.S.C. 154(b) by 0 days.

(21) Appl. No.: 10/138,604

(22) Filed: May 2, 2002

(51) Int. Cl.[7] .................................................. A63H 5/00
(52) U.S. Cl. ....................................... 446/207; 446/397
(58) Field of Search ................................ 446/207, 202, 446/208, 180, 188, 213, 397; 84/93, 350, 351, 352, 360, 362, 363, 364, 375, 383 R, 383 A, 456

(56) References Cited

U.S. PATENT DOCUMENTS

| | | | | |
|---|---|---|---|---|
| 2,317,458 A | * | 4/1943 | Herter | 446/207 |
| 2,606,400 A | * | 8/1952 | Olt et al. | 446/207 |
| 2,928,209 A | * | 3/1960 | Johnson | 446/207 |
| 3,066,443 A | * | 12/1962 | Mobley | 446/204 |
| 3,066,444 A | * | 12/1962 | Dieckmann | 446/207 |
| 4,050,186 A | * | 9/1977 | Shults et al. | 446/207 |
| 4,143,485 A | * | 3/1979 | Stewart | 446/207 |
| 4,915,660 A | * | 4/1990 | Overholt, Sr. | 446/207 |
| 5,830,036 A | * | 11/1998 | Richardson | 446/397 |
| 6,152,798 A | * | 11/2000 | Raburn | 446/207 |
| 6,234,860 B1 | * | 5/2001 | Cook | 446/208 |
| 6,575,804 B1 | * | 6/2003 | Primos | 446/202 |

* cited by examiner

Primary Examiner—Jacob K. Ackun
Assistant Examiner—Bena B. Miller
(74) Attorney, Agent, or Firm—Smith, Gambrell & Russell

(57) ABSTRACT

A bone shaped reed is provided for use in game call having a sounding board defining a central elongated groove. The reed has maximal width at each end for tonal quality and attachment purposes but has an arcuate portion along each margin defining a minimum width to prevent fouling due to the presence of water.

9 Claims, 7 Drawing Sheets

BONE REED FOR ANIMAL CALL

FIELD OF THE INVENTION

The present invention relates to the field of game calls devices and more particularly to game calls which require the hunter to blow into the call and thereby vibrate a reed tuned to create the sound of animal. In greater particularity, the present invention relates to a game call using an improved reed which facilitates the imitation of the desired game call. In still greater particularity the present invention may be considered an improved reed for use in a game call to avoid blockage and degradation of the call tonal quality due to the accumulation of moisture in the device.

BACKGROUND OF THE INVENTION

Hunters and naturalists have used sound to attract game since time beyond the memory of man. Even members of the general pubic mimic the sounds of birds and other animals in an attempt to elicit a response from the animal. Accordingly there is a wide array of products marketed, successfully or not, which are intended to attract or elicit a response from animals based on sound. Some such devices create sound by rubbing two substances together, such as "scrape" calls wherein a slate or other surface is stroked with a second piece of material. Such devices create vibration by pure mechanical interaction.

Other calls are inserted into the mouth and manipulated with the teeth and lips as the user blows on the device. These devices are small and are more commonly used for creating sounds that are similar in nature to those created with the scrape type devices. Additional calls are made using a reed inserted within a tubular member and supported on a sound board. In some instances these calls are tunable. These tubular calls are the ones in which the subject matter of this disclosure provides improved results. Typically the calls include a sounding board, a reed, and a barrel that may include a plurality of inter-fitting sections to hold the reed and sounding board and create a sound chamber.

Moisture accumulation in the calls has also been a problem, particularly in connection with the proper vibration of the reed. That is to say, moisture in the call can cause the reed to stick to the sounding board and therefore fail to vibrate properly. Various diverters to drain the moisture from the reed area have been taught in the prior art, however, none have been totally satisfactory.

SUMMARY OF THE INVENTION

It is an object of the present invention to reduce the effects of moisture accumulation proximal the reed in the game call.

A related object of the invention is to promote the dissipation of moisture from proximal the reed of the game call.

A further related object of the invention is to reduce the surface contact between the reed and the sounding board to thereby reduce the tendency of the surfaces to stick when wet.

Yet another object of the invention is to enhance consistent sound control by defining a consistent flex point in the reed.

Still another of object of the invention is to reduce the amount of air required to create the desired sound.

These and other objects and features of my invention are accomplished through the use of an improved reed which facilitates the forgoing objects due to it's novel and unique shape in interacting with the sounding board. The reed has a "bone" shape or hour glass shape that reduces the marginal abutment with the sounding board to aid in the forgoing objects.

BRIEF DESCRIPTION OF THE DRAWINGS

Devices embodying features of my invention are depicted in the appended drawings, which form a portion of this disclosure and wherein.

DESCRIPTION OF THE PREFERRED EMBODIMENT

Figure 1:
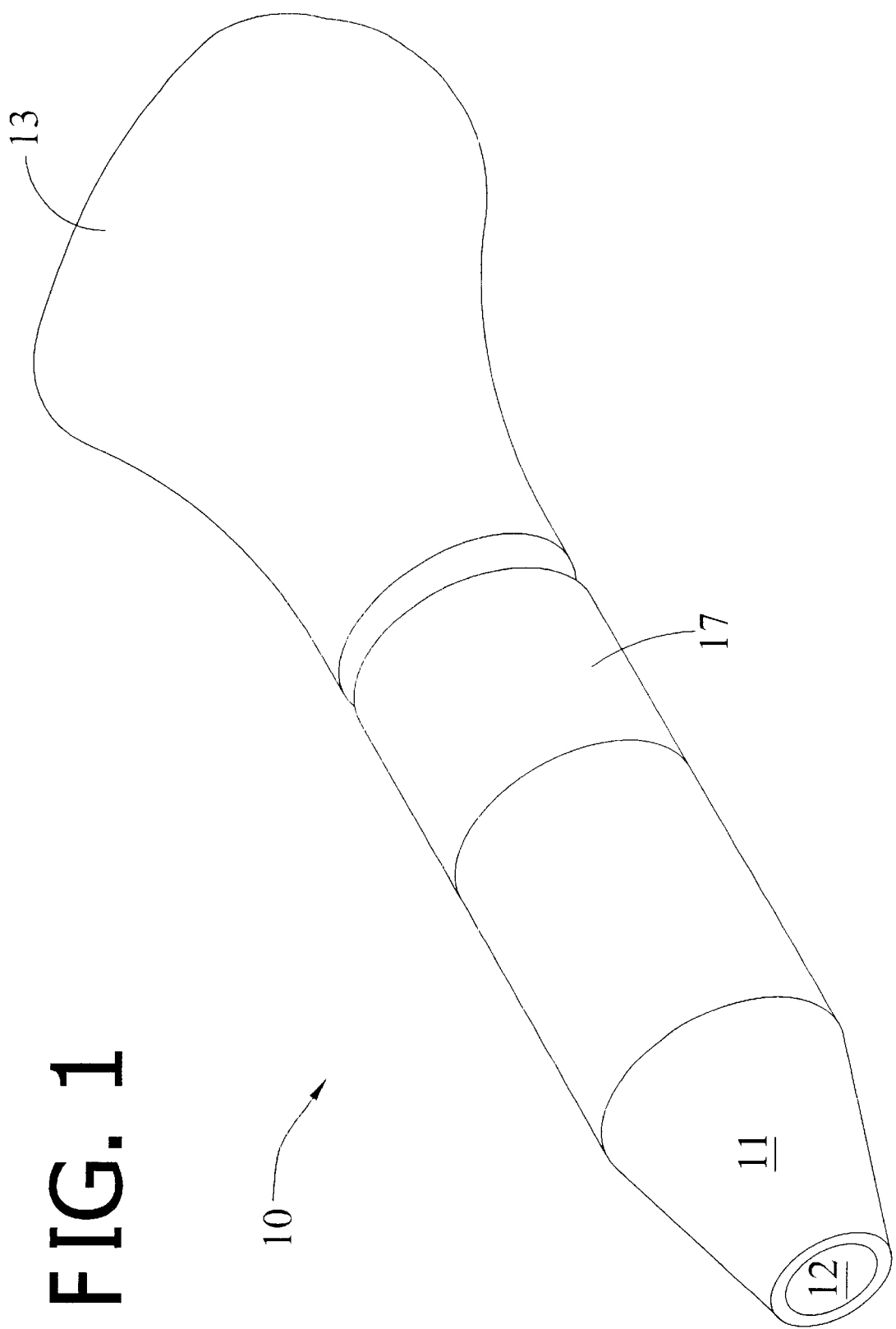
FIG. 1 is a perspective view of a game call device.
Figure 2:
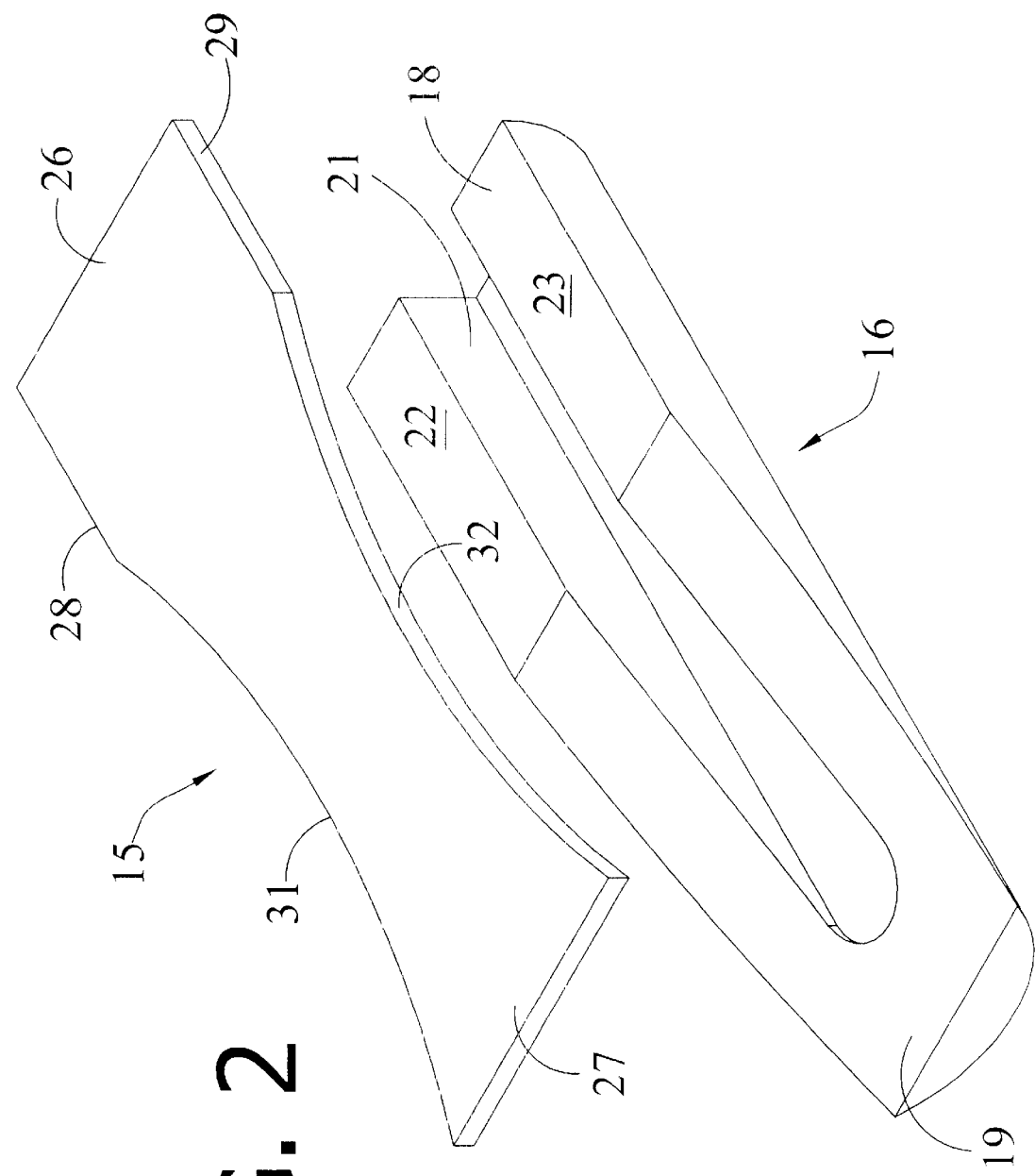
FIG. 2 is a perspective view of a bone reed and sound board.
Figure 3:
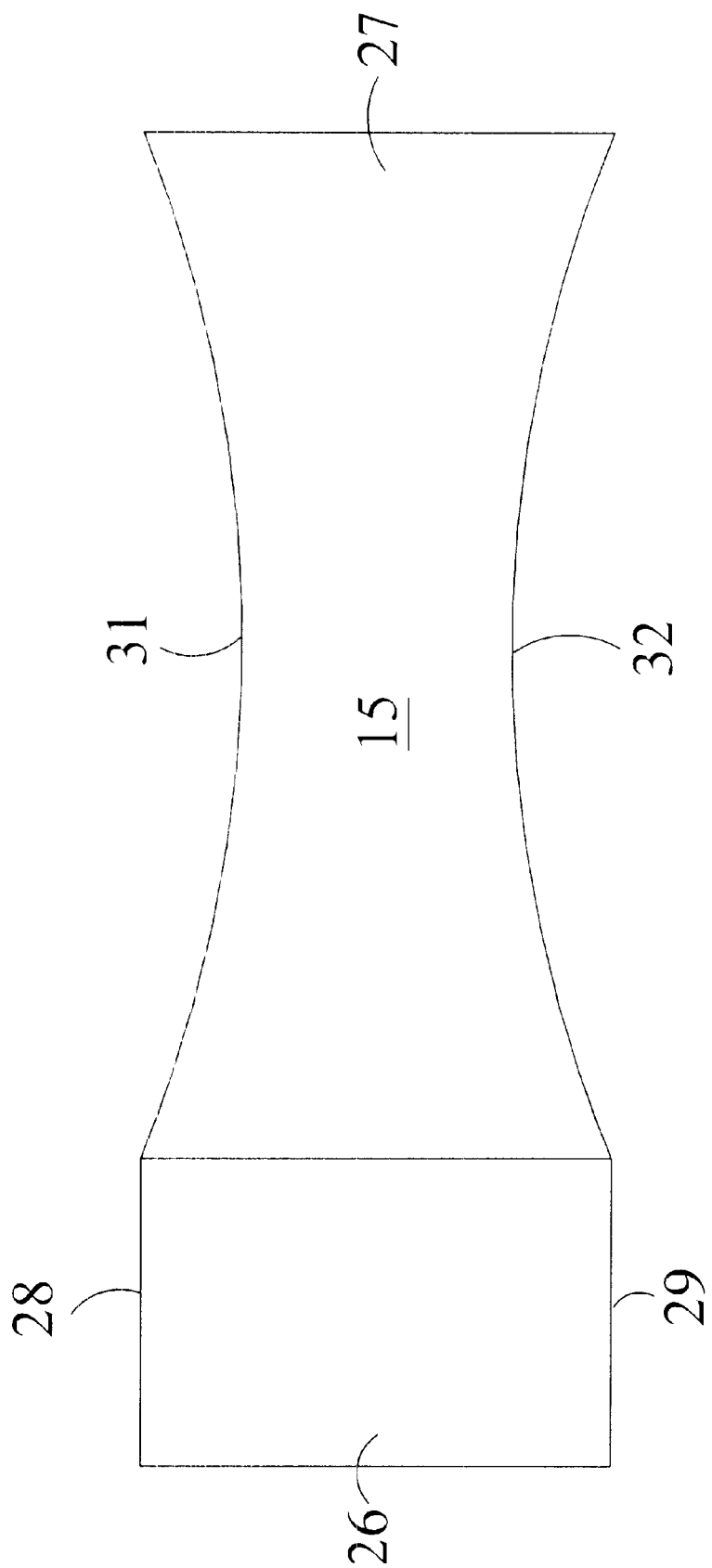
FIG. 3 is a top view of a bone reed.
Figure 4:
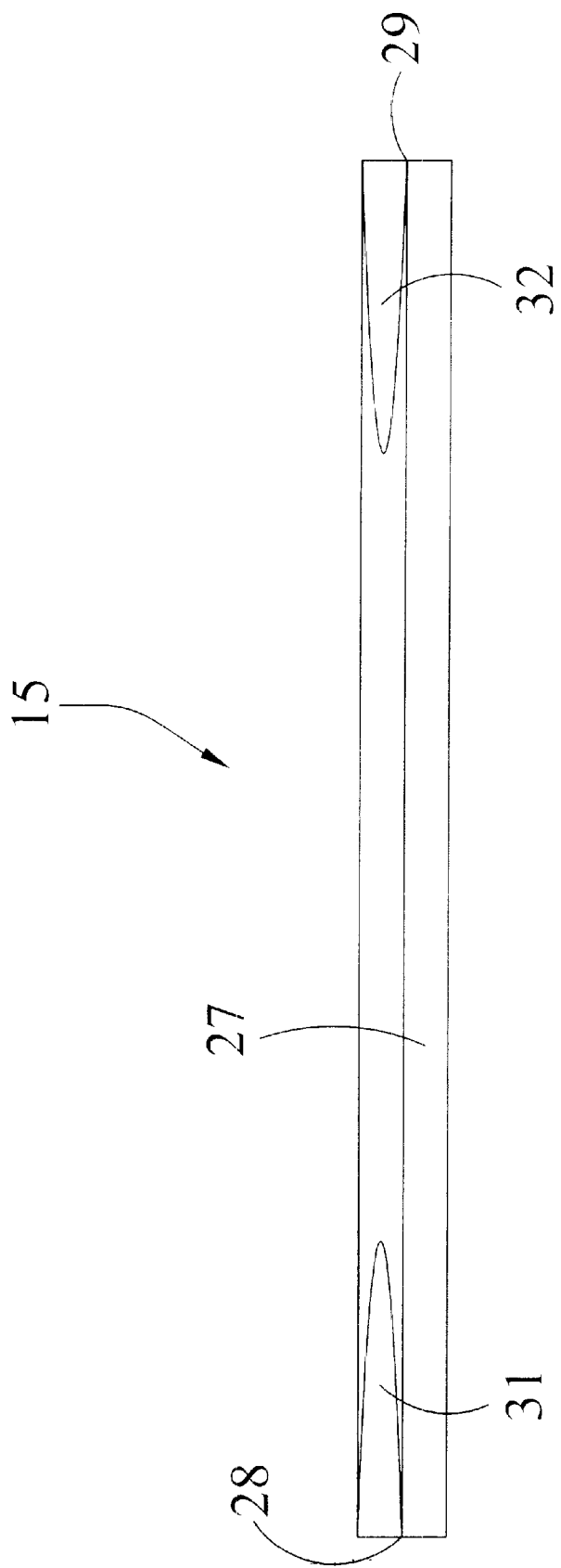
FIG. 4 is a front view of a bone reed.
Figure 5:
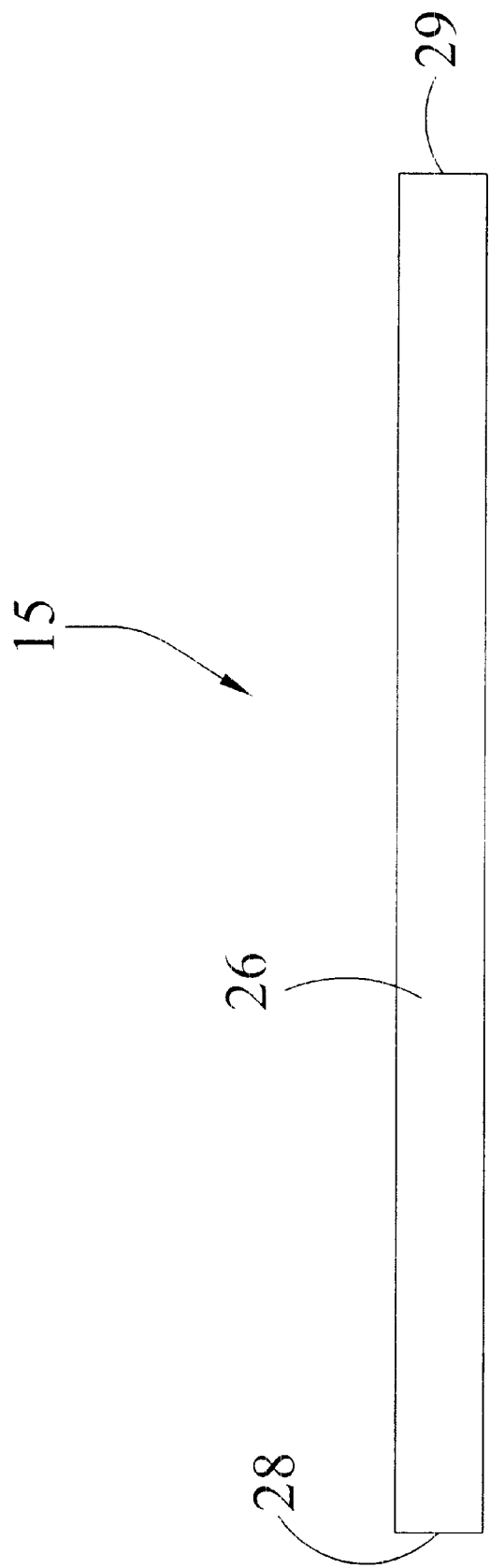
FIG. 5 is a rear view of a bone reed.
Figure 6:
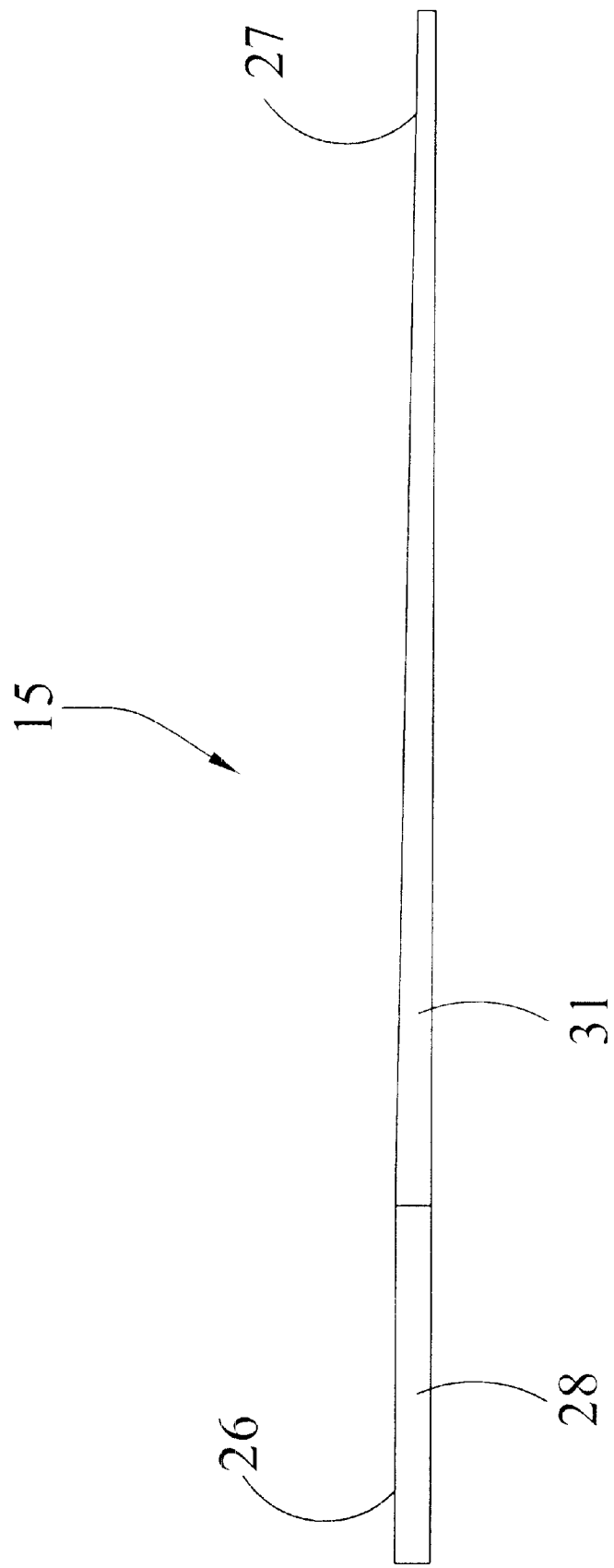
FIG. 6 is a side view of a bone reed.

Referring to the figures for a clearer understanding of the invention, it may be seen in FIG. 1 that the present invention is to be used in a game call device 10 having a mouthpiece 11 which may or may not taper to an opening 12 through which the user forces air to flow. At the opposite end of call 10 is a bell 13 or other terminal member through which air passes and which is intended to add tonal qualities. Intermediate the mouthpiece and the bell 13 is a reed 15 and a sound board 16. Reed 15 is secured by fitting into of the mouthpiece or an intermediate connector 17 which connects mouthpiece and bell and secures the reed and sound board in position relative to the mouth piece.

Sounding board 16 is generally formed from a singe piece and has a distal 18 end which in conjunction with the reed is held in position relative to the call 10 and a proximal end 19 which is near the opening of the mouthpiece 11. Sounding board 16 forms a groove 21 along its length and a pair of elongated lands 22,23 along either side of groove 21. Reed 15 rests atop the lands 22,23.

Reed 15 includes a distal end 26, sometimes referred to as a cork end, which is engaged in the device to hold the reed in proper position. Reed 15 has length commensurate with the size of the sounding board and terminates at a proximal end 27, sometimes referred to as the flare end, which is free and vibrates when air is forced through the device. It will be noted in the drawings that Reed 15 is concave on each of its lateral margins 28, 29 from flare end over a major portion of the length. The concavity of each lateral margin may be called the radiused recesses and is specifically designed to provide a radiused cut out portion 31, 32 along the length of the reed which will have a width defined to reduce overlying abutment with lands 22,23.

In as much as the radiused cutout portions 31, 32 do not provide as much contact the lands of the sounding board they cannot provide as much surface tension due to moisture accumulation on the reed. The cut out portion may diminish in width to less than the width of groove 21 such that moisture atop the reed can pass into the groove and thus out of the groove and away from the reed. It will be appreciated that reeds may be used in various size calls therefore, specific examples are presented herein to assist in the proper sizing of the reed portions, however, the dimensions are not intended by way of limitation.

For a reed having an overall length of about 1.53 inches, the reed may have a width transverse cork end and flare end of about 0.54". The cut out portion would have a length of about 1.18" measured from flare end and the cork end would have a length of about 0.35 measured from the end of the cut out portion to the end of the reed. The minimum width of the cutout portion of the reed would be about 0.35" and the distance to the center minimum width from the flare end would be about 0.64".

As may be appreciated, the radius cut out will also tend to form a consistent flex point at or near the minimum width of the reed, thus maintaining consistent sound control. Further, the radius cut out will allow for less rigidity at the flex point of the reed. This will allow the user to blow less air to achieve the same vibration and have better tone control due to less exertion. By virtue of the flare end having full width or near full width the reed is able to maintain the proper tone for the call, and by virtue of the cork end having full width the reed held securely in place and thus tone is not diminished. Further, the flare end provides sufficient weight on the tip of the reed to enable the call to respond to air flow more rapidly and more easily.

Figure 7:
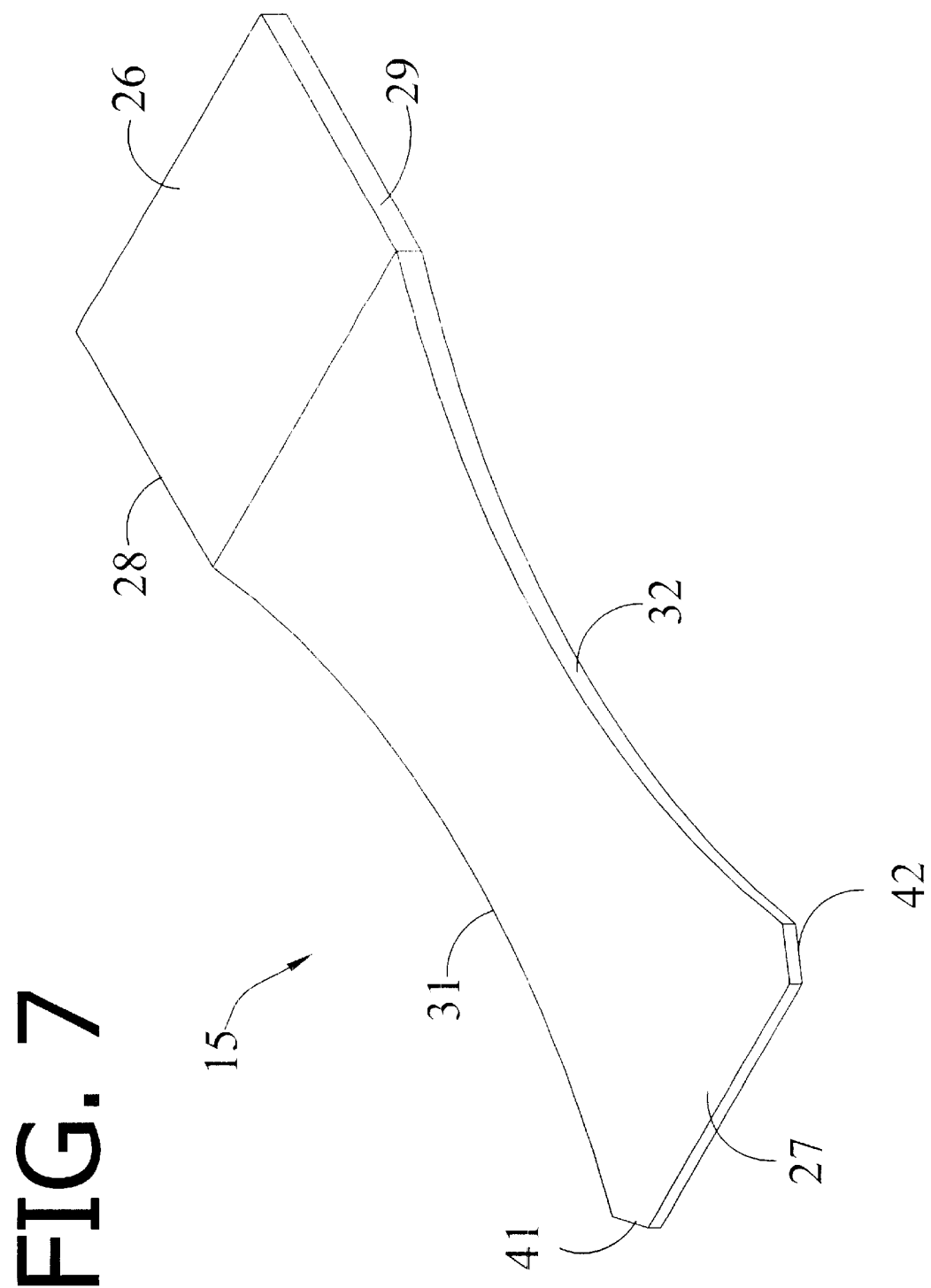
FIG. 7 is a perspective view of a second embodiment of a bone reed.

A second embodiment for a reed for a single reed game call is shown in FIG. 7. The flare end has beveled corners 41, 42 to diminish unwanted harmonics at the corner of the reed. Specific details of a reed in this embodiment yield are given by way of example rather than limitation. Over all reed length is about 1.50" and the reed width at the cork end is 0.51" with a minimum reed width of 0.29". Flare end has a width of 0.39" and each beveled surface 41,42 has a width of 0.07". The cut out portion starts at the end of the beveled portion and extends about 1.18", thus the cork end has length of about 0.38". The curvature of the radiused portion would be equivalent to the curvature of a circle having a diameter of about 2.93". It should be understood that the forgoing dimensions in both embodiments are to be used as guides in preparing reeds of different sizes in that the general proportion is to be considered along with the width of the sounding board groove over which the reed is to be positioned. Preferentially, the reed is made from a synthetic material such as plastic and has a thickness suitable for producing a tone similar to that of the selected game animal.

The forgoing description is intended by way of illustration and not limitation in that the invention is to be defined by the appended claims.

What is claimed is:

1. A reed for use in a game call wherein the game call includes a sounding board forming a groove between a pair of longitudinal lands, comprising an elongated sheet of flexible material having a first end with a transverse dimension greater than the width of said groove defining the maximum width of said elongated sheet, said first end adapted for affixation in said game call in abutting relationship to said lands, and a second end positioned for vibration responsive to air passing thereby, and opposing side margins wherein said side margins include concave symmetrical cutout portions which extend from proximal said second end over a major portion of said elongated sheet and define a minimum width for said sheet there between.

2. The reed as defined in claim 1 wherein said minimum width is less than the width of said groove.

3. The reed as defined in claim 1 wherein said cutout portions extend over approximately 72 to 78 percent of the length of the sheet.

4. The reed as defined in claim 1 wherein said cutout portion extends along about three fourths of the length of the sheet.

5. The reed as defined in claim 1 wherein said minimum width is greater than one half the maximum width of said sheet.

6. The reed as defined in claim 1 wherein said second end has corners which are beveled and said cutout portion is adjacent said corners.

7. In a game call having a mouthpiece and a sounding board wherein the sounding board forms a longitudinal groove having a substantially uniform width, an improved reed overlying said sounding board and defining a cork end for attachment relative to said sounding board overlying said groove, a free end positioned over said groove and marginal sides having arcuate recesses symmetrically defining a minimum width of said reed less than the width of said groove, whereby moisture accumulating on said reed may pass into said groove.

8. The reed as defined in claim 7 wherein said arcuate recesses extend over a major portion of each marginal side.

9. The reed as defined in claim 8 wherein said reed is substantially hour glass in shape.

* * * * *